June 6, 1961  R. D. WATSON  2,987,352
ZIRCONIUM BEARINGS AND PROCESS OF PRODUCING SAME
Filed Feb. 10, 1958

INVENTOR
Robert D. Watson
BY Alex. E. McRae
ATTORNEY ns Patent Office  2,987,352
Patented June 6, 1961

2,987,352
ZIRCONIUM BEARINGS AND PROCESS OF PRODUCING SAME
Robert D. Watson, Chalk River, Ontario, Canada, assignor to Atomic Energy of Canada Limited, Ottawa, Ontario, Canada
Filed Feb. 10, 1958, Ser. No. 714,133
3 Claims. (Cl. 308—241)

This invention relates to zirconium bearing members and to a process of producing them.

The problem of providing a bearing which will satisfactorily meet unusual service conditions such as lack or absence of lubrication or use of abnormal lubricants such as water and steam, has heretofore been recognized.

An object of the present invention is to provide a bearing member which will resist corrosion, galling, and wear under such unusual conditions, which will avoid build up of corrosion products during periods of operation, which may be at least partially renewable during periods of operation, and which may be produced in a simple and effective manner.

The invention contemplates a process for the production of a dimensionally stable bearing member which comprises forming a body of zirconium metal in a shape substantially identical with that of the desired bearing member, and subjecting said formed body to oxidizing conditions to form on its surface a blue-black zirconium dioxide layer.

The invention also resides in a corrosion and wear resistant bearing member consisting essentially of a body of zirconium metal having on its surface a blue-black zirconium dioxide layer formed by oxidation of the surface portion of said body.

The invention will be described with reference to the accompanying drawing, in which—

Figure 1:
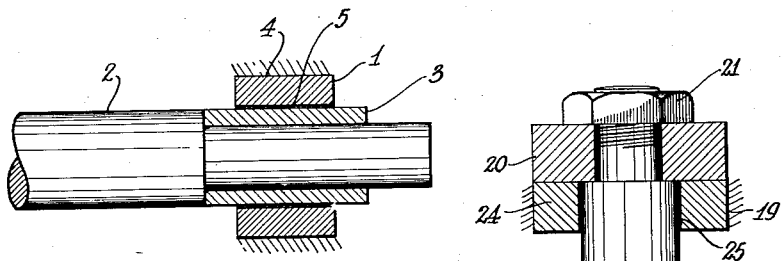
Figure 2:
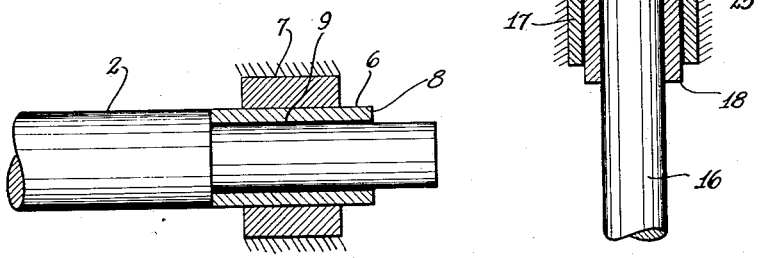
Figure 3:
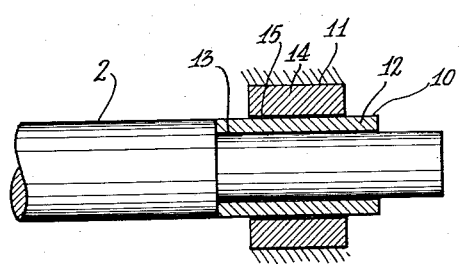
Figure 4:
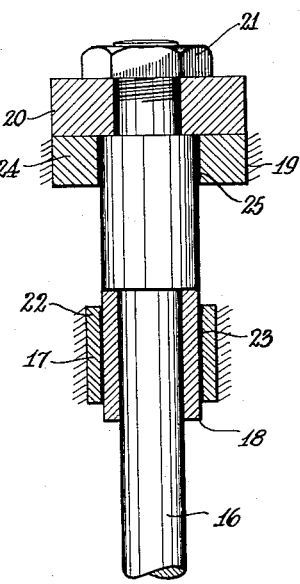

FIGURE 1 is a sectional elevation of a friction bearing structure utilizing a bearing in accordance with the invention, FIGURE 2 is a sectional elevation of a somewhat modified form of bearing structure, FIGURE 3 is a sectional elevation of a further modified form of bearing structure, and FIGURE 4 is a sectional elevation of a thrust and guide bearing structure also utilizing a bearing in accordance with the invention.

Referring to FIGURE 1, the bearing structure illustrated comprises a tubular bearing 1 which constitutes the bearing member in accordance with the invention and in which is journalled a shaft 2, the latter being provided with a journal insert 3 for engagement with the bearing. The bearing 1 consists of a body 4 of zirconium metal which has been formed in the desired shape and subjected to an oxidizing atmosphere to form on its surface a zirconium dioxide layer 5.

Referring to FIGURE 2, the bearing member of the present invention is in this instance a journal insert 6 on shaft 2, the bearing proper being indicated at 7. The journal 6 consists of a body 8 of zirconium metal having a zirconium dioxide layer 9 formed on its surface.

Referring to FIGURE 3, each of the journal insert 10 and bearing 11 is a bearing member in accordance with the invention. Journal 10 consists of a body 12 of zirconium metal having a zirconium dioxide layer 13 formed on its surface. Bearing 11 consists of a body 14 of zirconium metal having a zirconium dioxide layer 15 formed on its surface.

Referring to FIGURE 4, the shaft 16 is provided with a guide bearing 17 and complementary journal insert 18, as well as a thrust bearing collar 19 and complementary thrust washer 20 carried by the shaft as by a nut 21. Guide bearing 17 consists of a zirconium metal body 22 having a zirconium dioxide layer 23 on its surface. Thrust bearing 19 consists of a zirconium metal body 24 having a zirconium dioxide layer 25 on its surface.

Each of the bearing elements, in accordance with the invention, such as illustrated at 1, 6, 10, 11, 17 and 19, is produced by first forming the element from a body of zirconium metal, which is preferably hafnium free, in the shape of the required bearing member.

The shaped body is now subjected to oxidizing conditions whereby the surface metal oxidizes to form a layer of zirconium dioxide on the main body of metal. It is quite important that the oxidizing step be conducted only to a point where the zirconium dioxide formed is of particular crystalline form. Zirconium dioxide occurs in various crystalline modifications, including monoclinic tetragonal, cubic and hexagonal. For the purpose of the present invention, it is, of course, essential that the oxide layer be firmly adherent to the main body of metal. It has been found that if the oxidation of the surface of the zirconium body is conducted to the point where a zirconium dioxide of distinctive black or blue-black color is produced, the resulting oxide layer will be tenaciously adherent to the main body. This oxide layer is of highly oriented monoclinic crystalline form. On the other hand, if, for instance, the oxidation were continued until a white dioxide layer of normal monoclinic crystalline structure were produced, such layer would tend to separate and break off. The zirconium dioxide layer of the present invention is, as indicated above, a distinctive black or blue-black in color and has a density of approximately 5.31 grams/cubic centimeter.

The oxidation step is conducted in any suitable manner. Thus, it may be effected by heating the zirconium body in air, oxygen, steam or hot water. A convenient manner of conducting the step is simply to place the bodies in an electric furnace and heat the same in an atmosphere of air. The bodies may thereby be oxidized at temperatures ranging from 700° C. to 900° C. for periods ranging from ½ hour to six hours or more. At the higher temperatures, oxidation takes place quite rapidly and care must be taken to regulate the time of treatment since too long an oxidation period will produce an excessive dimensional change and a white oxide formation of normal monoclinic crystalline structure. If a large number of bearing members are treated at one time, it may be desirable to feed air into the furnace. The rate of air feed may be approximately one cubic foot per hour per hundred square inches of surface area of the bearing members under treatment. It is desirable that a thick blue-black oxide layer be produced with a minimum of dimensional change. A temperature of 800° C. and a period of two hours is generally effective in producing these desirable results. The oxide coating produced has a thickness of from approximately 0.0002″ to 0.0015″ and the resulting bearing element has an increase in diameter of approximately 0.0015″ per inch of diameter of the element.

The bearing element so produced with a surface consisting of a tightly adherent corrosion product has good corrosion, galling and wear resistance when employed under unusual service conditions. For instance, the element is quite satisfactory for use as a bearing with water lubrication only.

The following table gives the results of wear tests which been conducted using a bearing 0.939″ O.D. x 0.750″ I.D. by ¾″ long, and a journal 0.750″ x ¾″ long, completely immersed in water, the journal rotating at a speed of .56 feet per second and the bearing held stationary.

| Material | | Load, p.s.i. of Projected Area | Weight Loss in Milligrams | | Millions of Revolutions |
| --- | --- | --- | --- | --- | --- |
| Journal | Bearing | | Journal | Bearing | |
| 416 Stainless steel of Rockwell C45 hardness. | Hafnium free zirconium with oxide layer described. | 27 | 433 | 15 | 8.7 |
| 416 Stainless steel of Rockwell C45 hardness. | Hafnium free zirconium with oxide layer described. | 27 | 240 | 4.8 | 5.2 |
| Hard chrome plated 304 stainless steel. | Hafnium free zirconium with oxide layer described. | 34 | 30 | 3 | 2.5 |
| 304L Stainless steel with a surface oxide layer produced by heating in air at 900° C. for two hours. | Zirconium with surface oxide layer described. | 38 | 90 | 14 | 8.2 |
| 304 Stainless steel | Waukesha "88" alloy | 34 | 255 | 285 | 1.86 |

The corrosion rate of the bearing elements described at moderate temperatures is low and no appreciable build-up of corrosion products occurs during periods of inoperation. The wear and galling resistance is high, as previously indicated. It is believed that the oxide layer is partially renewed by the heat generated in the rubbing action of the surface under light loads. The hafnium free zirconium has a low neutron capture cross-section which permits its use as a bearing material in high flux regions of a reactor.

The bearing element described operates satisfactorily with water lubrication only in contact with various materials including hard chrome plate, Waukesha "88" alloy, 416 stainless steel both hardened and unhardened, chromallized 304 stainless steel, chromallized 1020 steel and 304 stainless steel.

I claim:

1. A bearing member consisting essentially of a body of zirconium metal having a tightly adherent surface layer of blue-black zirconium dioxide of monoclinic crystalline form, formed by oxidation of the surface portion of said body.

2. A bearing member consisting essentially of a body of zirconium metal having a tightly adherent surface layer of blue-black zirconium dioxide of monoclinic crystalline form, formed by oxidation of the surface portion of said body and having a density of 5.31 grams per cubic centimeter and a thickness ranging from 0.0002 inch to 0.0015 inch.

3. A bearing member consisting essentially of a body of zirconium metal having a tightly adherent surface layer of zirconium dioxide formed by oxidation of the surface portion of said body, said layer having a distinctive blue-black color and a thickness ranging from 0.002 inch to 0.0015 inch.

References Cited in the file of this patent

UNITED STATES PATENTS

| | | |
| --- | --- | --- |
| 2,105,015 | Singer | Jan. 11, 1938 |
| 2,202,773 | Given | May 28, 1940 |
| 2,622,993 | McCullough | Dec. 23, 1952 |
| 2,697,645 | Mitchell | Dec. 21, 1954 |

OTHER REFERENCES

A Comprehensive Treatise on Inorganic and Theoretical Chemistry by J. W. Mellor, Langmon, Green & Co., New York, N.Y., 1927, vol. VII, pages 123–128 relied on.

Some Properties of High Purity Zirconium and Dilute Alloys With Oxygen by R. M. Treco, published by American Society for Metals, Cleveland, Ohio, 1952, 19 pages, pages 6, 7 and 12 relied on.

The Properties of Zirconium by F. W. Boulger—A.E.C.D. 2726, Technical Information Division, A.E.C., Oak Ridge, Tenn., March 15, 1949, 82 pages, pages 19, 21 and 29 relied on.